(12) United States Patent
Gazsi et al.

(10) Patent No.: US 7,339,987 B2
(45) Date of Patent: Mar. 4, 2008

(54) DEVICE FOR CORRECTING A RECEIVING SIGNAL

(75) Inventors: Lajos Gazsi, Düsseldorf (DE); Matthias Schoebinger, München (DE)

(73) Assignee: Infineon Technologies AG, Munich (DE)

( * ) Notice: Subject to any disclaimer, the term of this patent is extended or adjusted under 35 U.S.C. 154(b) by 497 days.

(21) Appl. No.: 10/484,959

(22) PCT Filed: Jul. 24, 2002

(86) PCT No.: PCT/EP02/08250

§ 371 (c)(1),
(2), (4) Date: Jan. 27, 2004

(87) PCT Pub. No.: WO03/013086

PCT Pub. Date: Feb. 13, 2003

(65) Prior Publication Data

US 2004/0219896 A1    Nov. 4, 2004

(30) Foreign Application Priority Data

Jul. 27, 2001    (DE) .............................. 101 36 698

(51) Int. Cl.
*H03H 7/30* (2006.01)
(52) U.S. Cl. .................... 375/229; 455/138
(58) Field of Classification Search ............ 375/229, 375/230, 231, 233; 455/138
See application file for complete search history.

(56) References Cited

U.S. PATENT DOCUMENTS

| | | | |
|---|---|---|---|
| 4,433,425 A | 2/1984 | de Jaeger | |
| 4,524,424 A * | 6/1985 | White | 708/322 |
| 5,210,774 A * | 5/1993 | Abbiate et al. | 375/232 |
| 5,638,400 A * | 6/1997 | Yaguchi | 375/232 |
| 5,692,011 A | 11/1997 | Nobakht et al. | |
| 5,787,118 A * | 7/1998 | Ueda | 375/232 |
| 5,949,819 A | 9/1999 | Bjarnason et al. | |
| 6,879,649 B1 | 4/2005 | Radimirsch et al. | |

FOREIGN PATENT DOCUMENTS

| | | |
|---|---|---|
| DE | 32 31 768 A1 | 3/1984 |
| DE | 198 14 530 A1 | 10/1999 |
| JP | 05207076 A * | 8/1993 |

* cited by examiner

*Primary Examiner*—David C. Payne
*Assistant Examiner*—Leon Flores
(74) *Attorney, Agent, or Firm*—Maginot, Moore & Beck

(57) ABSTRACT

The invention relates to a device for correcting a receiver signal which is associated with an emission signal transmitted in a distorted transmission system. The emission signal comprises periods which can be determined by analyzing the received signal wherein determined properties are exhibited which are suitable for adjusting the correction. According to one embodiment, the device comprises a component for adjusting the correction based upon an analysis of the received signal and a component for monitoring and enabling the adjusting component when the received signal associated with the transmission signal exhibits certain characteristics.

28 Claims, 5 Drawing Sheets

DEVICE FOR CORRECTING A RECEIVING SIGNAL

FIELD OF THE INVENTION

The present invention relates to a device for equalizing a received signal and in particular to a device for equalizing a received signal of a transmission system.

DESCRIPTION OF PRIOR ART

In the case of digital transmission methods, adaptive equalization is an effective measure to compensate in particular for time-dependent distortions on the transmission link, such as due to ageing, temperature fluctuations or changing connection configurations. In view of the complexities available in the case of modern CMOS technologies for digital signal processing, such as for example the number of available logical gates and the associated signal processing possibilities, it is also attractive for cost reasons to reduce the requirements with regard to the tolerances of analog components/modules and to compensate for the resulting system imperfections that are caused by process fluctuations, but also by time-variant external influences, such as for example temperature fluctuations, by means of an adaptive equalizer. Time-variant phenomena, such as for instance the changing of the transmission function of analog components on account of a temperature drift, in this case occur on a time scale which is several orders of magnitude longer than the symbol period. This is therefore a quasi-static problem, i.e. the optimum equalization, such as for example the optimum coefficient setting for a filter, of an equalizer is virtually time-independent. Only the spectral properties of the transmission spectrum are time-variant under some circumstances.

The setting of an adaptive equalizer can be carried out with the aid of the transmission of a known data sequence (data-aided), such as for example a preamble. In the case of many transmission methods, however, in particular in the case of continuous transmission by contrast with burst mode, or for example block-based methods, such as multi-carrier transmission, the transmission of such a known data sequence is not envisaged. An adaptive equalizer may therefore alternatively be constructed in such a way that the information for the setting of the adaptive equalizer is derived from the received and possibly falsified data alone. This presupposes that the transmitted data sequence has particular properties.

One particular property of such a data sequence is, for example, that the input spectrum must cover the entire frequency range of the equalizer. This property is not ensured for example in the case of decimating equalizers, which reduce the data rate, for example by subsampling of the signal, from the input to the output. The frequency range of the equalizer in this case extends to $f_{sampling}/2$, where $f_{sampling}$ is for example an integral multiple of $f_{symbol}$. The signal energy is essentially restricted to a range $<f_{symbol}/2$. The lacking signal energy above $f_{symbol}/2$ may cause a problem which is known by the term "tap wandering" or coefficient wandering. $f_{symbol}$ here is the symbol frequency of transmitted symbols, which are represented for example by voltage levels in a transmitted signal.

A further particular property of the above-mentioned data sequence is, for example, that the successive data must not be correlated, i.e. the input spectrum must be "white" and must ideally have a flat frequency profile with a low-pass characteristic. This property can be ensured if a pseudo-random sequence is generated from the data before the transmission by means of a scrambler.

There are, however, a whole series of applications in which nothing can be stated about the properties of the transmission spectrum over time. The reason for this is that the coding schemes used are chosen merely with a view to ensuring special properties of the system, such as for example facilitating clock recovery or the absence of a direct component in the transmission spectrum. In particular, a scrambler is not usually provided.

One example of such an application is digital data transmission within the PDH (=Plesiochronous Digital Hierarchy) according to the $T_x$ standard or $DS_x$ standard in the USA (x=1:1.544 Mbit/s data transmission rate; x=3:44.736 Mbit/s data transmission rate) or the Ex standard in Europe (x=1: 2.048 Mbit/s data transmission rate; x=3:34.368 Mbit/s data transmission rate), for which components are currently required in large volume (large numbers of items). A further example of such an application is the digital transmission between a physical layer (PHY; PHY=Physical Layer) of a 10 gigabit/s transmission via glass fibre and the associated intermediate access layers (MAC; MAC=Medium Access Layer) via the so-called "Ten Gigabit Attachment Unit Interface (XAUI)", which are specified within the IEEE Standard P802.3ae. The aim is to permit the greatest possible physical separation of these layers. This application will be of enormous significance in the near future.

Furthermore, in the case of many systems, the transmission spectrum deviates more or less significantly from the ideal of a "flat" baseband spectrum with a low-pass character. When a line coding as in the aforementioned Tx/Ex transmission is used, in the case of which the transmission spectrum is not intended to have any direct component, there occurs for instance a passband characteristic, in the case of which the spectrum in the pass band is also not flat.

Individual effects, such as the frequency-dependent attenuation in the case of transmission via two-wire copper lines, which is determined by the length of the line, or the distortions which are induced by tolerances in the cut-off frequency of an analog anti-aliasing filter with a known transmission function, can be compensated by means of an equalizer which is fixed but can be set, in the form of a programmable filter.

The setting of such an equalizer on a chip can take place on the one hand externally, such as for example by the selection of coefficients from sets of coefficients which are stored on the same chip, or by external programming. In this case, for example, a setting at which the lowest bit error rate is achieved may be chosen. However, also possible on the other hand is a setting by a control unit on the chip, which can select between the coefficients which are stored on the chip by means of a suitable criterion.

In both cases, the stored coefficients can approximate the transmission function that is inverse to the distortion and be determined for instance by minimizing a suitable cost function, such as for example a criterion of a least mean square error (LMS; LMS=Least Mean Square). In the case of many applications, however, there are practical limits to such a procedure, since only a limited number of sets of coefficients can be stored. Such a procedure may be useful whenever it is intended to compensate essentially for a dominant distortion, which moreover is determined by few parameters. Time-variant phenomena, such as for example temperature fluctuations, ageing etc., cannot generally be taken into account in this way.

A problem in the prior art is therefore that the known settable equalizers can only be used to a limited extent to compensate for distortions of, for example, a transmission link and analog components.

A further problem in the prior art is that virtually no time-variant distortions, caused for example by temperature fluctuations, ageing etc., can be compensated with the known settable equalizers.

SUMMARY OF THE INVENTION

The object of the present invention is consequently to provide a transmission system which comprises a device for equalizing the received signal permitting flexible equalization of time-variant distortions that are caused in particular by the transmission system. In this case, the device for equalizing a received signal must be designed in such a way that equalization is also achieved when nothing can be stated a priori about the time with respect to the spectrum of the received signal.

The idea on which the present invention is based is that automatic adaptation methods which have proved successful in the case of continuous transmission of data with a white spectrum are combined with a time-limited, that is block-by-block, evaluation of the data stream, in a way similar to in the case of data-aided methods, in which the transmitted data are known.

By contrast with such methods, which for example use a known frame structure and a preamble transmitted along with it, in the case of the proposed method the blocks of the received signal that can be used for the adaptation are determined automatically. Such a method with a corresponding extra effort for the evaluation of the received signal and the corresponding activation of the adaptation is attractive in view of the technological advancement (or the increasing available complexity on a chip).

One advantage of the present invention is that, with the aid of the present invention, the advantages presented above of adaptive equalization can also be used in the case of transmission methods in which nothing can be stated about the properties of the transmission spectrum over time. The invention can also be used in those cases in which there is no transmitted signal at all in a temporally unforeseeable way.

A further advantage of the present invention is that it can be extended in a simple manner to be used in cases in which the convergence behavior of the adaptive equalization is poor.

According to a preferred development of the invention, the same also has a first means for taking decisions and for supplying a first estimate signal, which estimates the transmitted symbols of the transmitted signal and supplies the estimated symbols with the first estimate signal.

According to a further preferred development of the device, the same also has a first means for supplying a first error signal, which determines the first error signal from the difference between the first estimate signal, which is supplied by the first means for taking decisions, and the first equalized received signal, which is supplied by the first means for equalizing.

According to a further preferred development of the invention, the means for setting the settable equalization determines the first settable equalization of the first means for equalizing the received signal from the received signal and the first error signal.

According to a further preferred development of the device, the means for setting the settable equalization derives the first settable equalization of the first means for equalizing the received signal from the correlation of the received signal and the first error signal.

According to a further preferred development of the device, the means for monitoring the received signal switches the first error signal through to the means for setting the settable equalization and activates the means for setting the settable equalization when the transmitted signal assigned to the received signal has the particular properties.

According to a further preferred development of the device, the same also has a second means for equalizing the received signal and for supplying a second equalized received signal, the second means for equalizing the received signal having a second settable equalization.

According to a further preferred development of the device, the same also has a second means for taking decisions and for supplying a second estimate signal, which estimates the transmitted symbols of the transmitted signal and supplies the estimated symbols in the second estimate signal.

According to a further preferred development of the device, the same also has a second means for supplying a second error signal, which determines the second error signal from the difference between the second estimate signal, which is supplied by the second means for taking decisions, and the second equalized received signal, which is supplied by the second means for equalizing the received signal.

According to a further preferred development of the device, the means for setting the settable equalization determines the second settable equalization of the second means for equalizing the received signal from the received signal and the second error signal.

According to a further preferred development of the device, the means for setting the settable equalization derives the second settable equalization of the second means for equalizing the received signal from the correlation of the received signal and the second error signal.

According to a further preferred development of the device, the means for monitoring the received signal switches the second error signal through to the means for setting the settable equalization and activates the means for setting the settable equalization when the transmitted signal assigned to the received signal has the particular properties.

According to a further preferred development of the device, the same also has a means for comparing, which compares a first quality level, which is derived from the first error signal, and a second quality level, which is derived from the second error signal, and, if the second quality level is greater than the first quality level, instigates that the set equalization of the second means for equalizing the received signal is supplied by the means for setting the settable equalization to the first means for equalizing the received signal.

According to a further preferred development of the device, upstream of the means for comparing there are arranged a first and a second means for ascertaining a quality level, which derive the first and second quality levels from the first error signal and the second error signal and supply them to the means for comparing.

According to a further preferred development of the device, the first and second quality levels are derived from the mean square error of the first error signal and the second error signal.

According to a further preferred development of the device, the means for monitoring the received signal monitors optionally either the first equalized received signal, which is supplied by the first means for equalizing the received signal, or the first estimate signal, which is supplied by the first means for taking decisions.

According to a further preferred development of the device, the means for monitoring the received signal monitors optionally either the second equalized received signal, which is supplied by the second means for equalizing the received signal, or the second estimate signal, which is supplied by the second means for taking decisions.

According to a further preferred development of the device, the same also has a first shaping filter, which supplies a shaped received signal to the second means for equalizing the received signal and the means for setting the settable equalization, and a second shaping filter, which has a filter function corresponding to the first shaping filter and supplies a shaped second estimate signal to the means for supplying a second error signal.

According to a further preferred development of the device, the same also has a first shaping filter, which supplies a shaped received signal to the means for setting the settable equalization, and a second shaping filter, which has a filter function identical to the first shaping filter and supplies a shaped second error signal to the means for monitoring the received signal.

According to a further preferred development of the device, the first and/or second means for equalizing the received signal have a programmable filter, the equalization of which can be set by means of filter coefficients by the means for setting the settable equalization.

According to a further preferred development of the device, the first and/or second means for equalizing the received signal also respectively have a first memory for storing a first set of filter coefficients.

According to a further preferred development of the device, the first set of filter coefficients has filter coefficients which are used in the initialization of a transmission of transmitted signals.

According to a further preferred development of the device, the first and/or second means for equalizing the received signal also have a second memory for storing a second set of filter coefficients.

According to a further preferred development of the device, the second set of filter coefficients has filter coefficients which are supplied by the means for setting the settable equalization.

According to a further preferred development of the device, the means for monitoring the received signal has a filter bank, in order to determine the energy distribution in the received signal.

According to a further preferred development of the device, the filter bank has bandpass filters.

According to a further preferred development of the device, the means for monitoring the received signal carries out a Fourier transformation, in order to determine the energy distribution in the received signal.

According to a further preferred development of the device, the transmitted signal has as a particular property of the particular properties of the transmitted signal a flat baseband spectrum with a low-pass characteristic.

According to a further preferred development of the device, deviations of the transmitted signal from a flat baseband spectrum with a low-pass characteristic are taken into account in the means for monitoring the received signal in the form of a corresponding reference spectrum.

DETAILED DESCRIPTION

Figure 1:
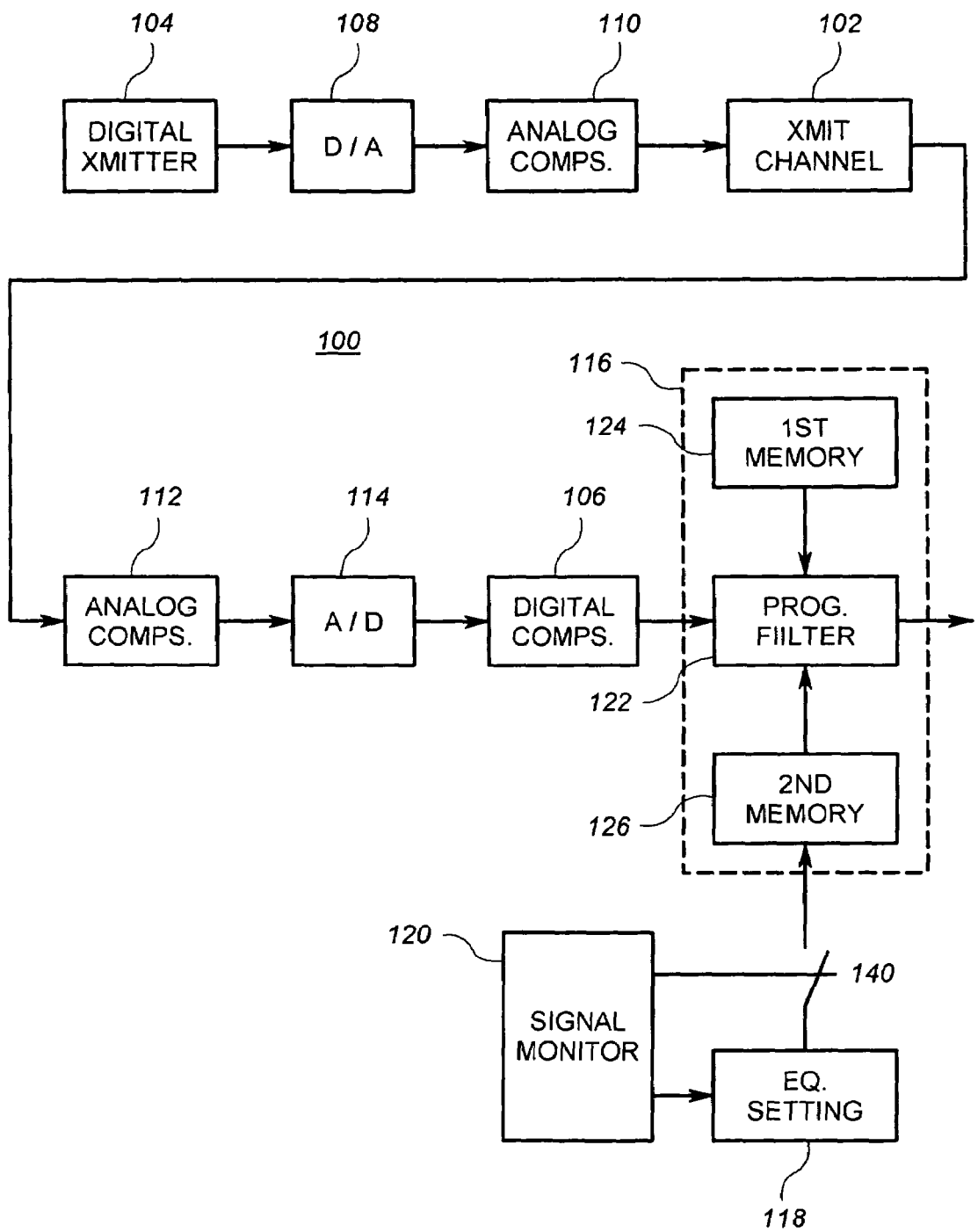
FIG. 1 shows a general representation of the present invention.

In the figures, the same reference numerals or reference numerals which differ only in the first digit designate component parts that are the same or functionally the same.

FIG. 1 shows a general representation of the present invention. A transmission system 100, in which the present invention is used, comprises a transmission channel 102, which is arranged between a transmitter 104 and a receiver, which comprises the components 112, 114 and 106. When a digital transmitter 104 is used, the transmission path of the transmission system 100 has, following the transmitter, a digital/analog converter 108, which converts the digital transmitted signal of the transmitter 104 into an analog transmitted signal, followed by further analog components 110, by means of which the analog transmitted signal is fed into the transmission channel 102. The reception path also has, equivalent to this, analog reception components 112, for example anti-aliasing filters, and an analog/digital converter 114 for converting the analog received signal into a digital received signal. The reception path may also comprise further digital components 106, such as means for raising or reducing the sampling rate.

FIG. 1 also generally shows a device according to the invention for equalizing a received signal, which equalizes the received signal of the transmitter after the digital components 106. The received signal is assigned to the transmitted signal that is transmitted in the distorting transmission system 100. The transmitted signal has time segments in which the same has particular properties, such as for example a white frequency spectrum, in the case of which successive data are not correlated with one another, and/or a flat frequency profile with a low-pass characteristic.

The device for equalizing the received signal has a means 116 for equalizing the received signal and for supplying an equalized received signal, the means 116 for equalizing the received signal having a settable equalization. The device for equalizing the received signal also has a means 118 for setting the settable equalization (automatic adaptation) of the means 116 for equalizing the received signal in accordance with the received signal and a means 120 for monitoring the received signal and for activating the means 118 for setting the settable equalization when the transmitted signal assigned to the received signal has particular properties, such as for example a white frequency spectrum, that are suitable for setting an equalization of the distortion of the received signal caused by the transmission system.

The means 116 for equalizing the received signal and for supplying a first equalized received signal preferably has a programmable filter 122, the equalization of which can be set by means of filter coefficients by the means 118. The means 116 for equalizing also has a first memory 124 for storing a first set of filter coefficients and a second memory 126 for storing a second set of filter coefficients. The first set of filter coefficients preferably has filter coefficients that are used in the case of the initialization of a transmission of transmitted signals or in the case of a cold start, and may also contain various coefficients by means of which the means 116 for equalizing can be set differently during operation. The second set of filter coefficients is preferably supplied by the means 118 for setting the settable equalization and preferably contains the momentary equalizer setting with regard to a warm start.

For the function of the device according to the present invention, it is assumed that there are time segments during which the transmitted signal has the properties required for an automatic adaptation in the means 118 for setting. By means of the means 120 for monitoring the received signal or by means of a monitor, the statistical properties of the transmitted signal can be monitored and the time segments in which the transmitted signal or the assigned received signal is suitable for the adaptation can be determined. During such time segments, an automatic coefficient adaptation can then be activated by the means 118 for setting. In this case, different methods, known from the literature, can be used for the adaptation. If no suitable received signal is available for the automatic adaptation, the adaptation is deactivated by the means 118 for setting the settable equalization. In certain time segments, the coefficients ascertained by means of adaptation by the means 118 for setting can be taken over into the programmable filter 122. It is expedient to store the newly taken-over coefficients in the second memory 126. These coefficients are then available once again for example for a possible warm start. The taking over of the coefficients from the means 118 for setting into the second memory 126 of the means 116 for equalizing may take place at regular time intervals, controlled by the means 118 for setting, but also by the means 120 for monitoring the received signal by means of switches 140. It is advantageous, however, to check by means of a suitable cost function whether the coefficient setting produces any improvement of the reception properties at all. In this way, the taking over of erroneous or unfavourable coefficient settings, which cannot be ruled out in view of the problems described with the transmission spectrum, can be avoided.

Figure 2:
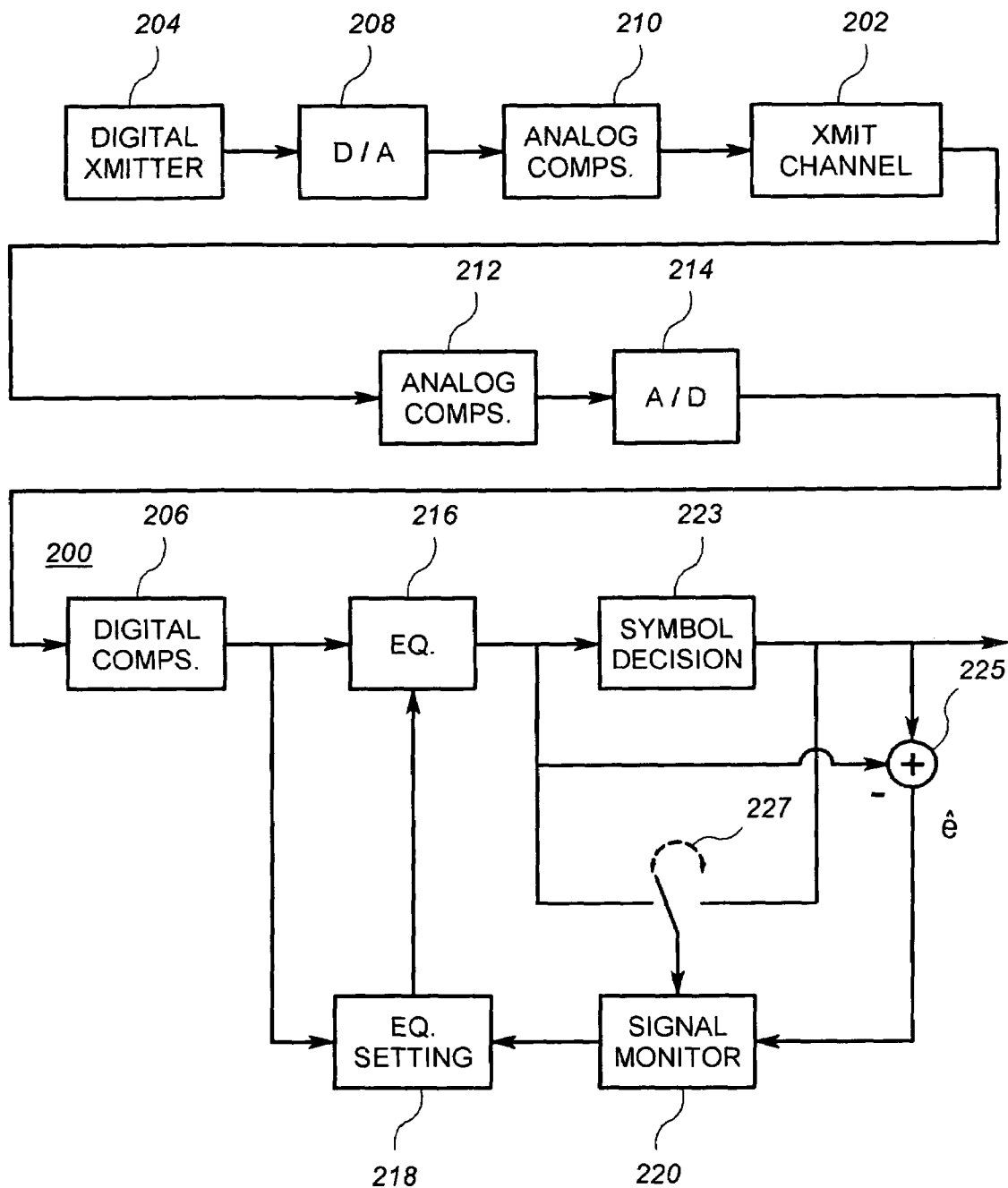
FIG. 2 shows a first exemplary embodiment according to the present invention.

FIG. 2 shows a first exemplary embodiment of a device for equalizing a received signal, which is assigned to a transmitted signal that is transmitted in a distorting transmission system 200, the transmitted signal having time segments in which the same has particular properties, such as for example a white frequency spectrum, that are suitable for analyzing the distortion of the received signal caused by the transmission system 200 and for setting the equalization of the received signal. As already shown in FIG. 1, the transmission system 200 preferably has a transmission channel 202, which is arranged between a digital transmitter 204 and a receiver, which comprises the components 212, 214 and 206. Arranged downstream of the digital transmitter 204 are preferably a digital/analog converter 208 followed by further analog components 210. The reception path has analog components 212, for example anti-aliasing filters, an analog/digital converter 214 and further digital components 206, such as means for raising or reducing the sampling rate. The device for equalizing the received signal receives the received signal from the digital components 206.

The device for equalizing a received signal has a means 216 for equalizing the received signal and for supplying a first equalized received signal, which has a settable equalization. The device for equalizing a received signal also has a means 218 for setting the settable equalization of the means 216 for equalizing the received signal in accordance with the received signal and a means 220 for monitoring the received signal and for activating the means 218 for setting when the transmitted signal assigned to the received signal has the particular properties.

In a way similar to in FIG. 1, the means 216 for equalizing the received signal preferably has a programmable filter, the equalization of which can be set by means of filter coefficients by the means 218 for setting. The programmable filter may in this case have a first memory for storing a first set of filter coefficients, which is preferably used in the initialization (cold start) of a transmission of transmitted signals, and a second memory for storing a second set of filter coefficients, which is supplied by the means 218 for setting and is obtained from an adaptation or optimization.

The means 220 for monitoring the received signal preferably has a filter bank, in order to determine the energy distribution in the received signal. The filter bank allows evaluation of whether the estimated transmission spectrum has adequate energy in all frequency ranges, the nominal transmission spectrum serving as a reference. In many cases, a filter bank with a small number of bandpass filters is adequate for this. As an alternative to such a modular and regular arrangement with the known advantages with regard to implementation on a small surface area and with little loss of performance, the means 220 for monitoring the received signal may alternatively or additionally carry out a Fourier transformation, such as for example a discrete Fourier transformation or an FFT (=Fast Fourier Transform), in order to determine the energy distribution in the received signal.

The device for equalizing a received signal also has a means 223 for taking decisions and for supplying an estimate signal, which estimates the transmitted symbols of the transmitted signal and supplies the estimated signals with the estimate signal, and a means 225 for supplying an error signal ê, which determines the error signal ê from the difference between the estimate signal, which is supplied by the means 223 for taking decisions, and the equalized received signal, which is supplied by the means 216 for equalizing.

As shown in FIG. 2, the means 218 determines the settable equalization of the means 216 for equalizing the received signal automatically from the received signal and the first error signal ê. The settable equalization of the means 216 for equalizing the received signal is in this case preferably derived from the correlation of the received signal and the error signal ê. The means 220 for monitoring the received signal switches the error signal through to the means 218 for setting the settable equalization for updating the setting of the means 216 and activates the means 218 for setting when the transmitted signal assigned to the received signal has the particular properties, such as for example a white frequency spectrum or adequate signal energy in all frequency ranges. The means 220 for monitoring the received signal monitors optionally either the equalized received signal, which is supplied by the means 216 for equalizing the received signal, or the estimate signal, which is supplied by the means 223 in the form of a decision with respect to the symbol alphabet used.

FIG. 2 presents these two possible options, which can be selected by means of the switch 227. The first option, as mentioned, comprises the selection of the received signal equalized by the means 216 for equalizing before the means 223 for taking decisions, which is used for example when the means 216 for equalizing is set close to its optimum, and the errors are in practice not correlated with the transmitted signal, and consequently meaningful monitoring is possible.

The second option comprises the selection of the estimate signal after the means 223 for taking decisions, which is advantageous when an error-free estimate of the transmitted symbols takes place by the means 223 for taking decisions and therefore no error contribution enters the means 220 for monitoring the received signal. In view of the in some circumstances strong distortions in the transmission channel 202, the equalized received signal downstream of the means 223 for taking decisions comes into consideration primarily for monitoring of the transmission spectrum, on the basis of which the transmitted symbols can be estimated.

The coefficient adaptation in FIG. 2 is shown for the so-called MMSE algorithm, in the case of which the updating of the individual coefficients is derived from the correlation of the received signal or the input signal of the means 216 for equalizing with the correspondingly delayed error signal ê after the means 223 for taking decisions. This algorithm is preferably also used in the following exemplary embodiments.

Since it cannot be ensured how long the time segments available for the adaptation are and in what time interval they follow one another, the adaptation rate of the method is not known from the outset. Moreover, in spite of the monitoring of the data, it is not possible to rule out the chance that the means 216 for equalizing has in the meantime assumed a setting that is unfavourable, for example with respect to the mean square error (MSE) after the means 223 for taking decisions and only very slowly converges in the direction of the optimum equalization. Losses of performance on account of such "inadvertent states" can be obviated if an additional second means for equalizing a received signal or an additional adaptive equalizer is provided parallel to the reception path with the first means for equalizing the received signal, as described below.

Figure 3:
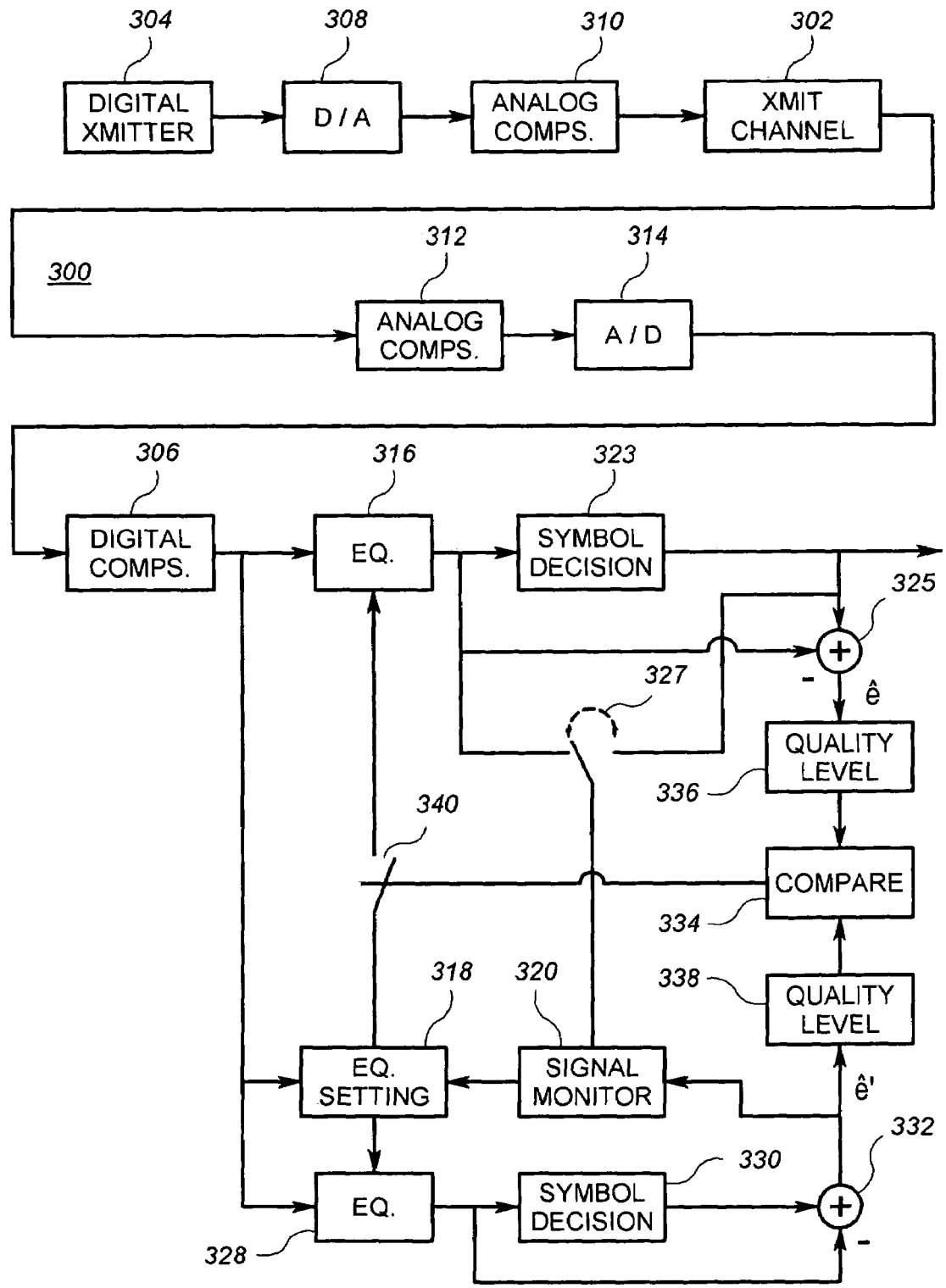
FIG. 3 shows a second exemplary embodiment according to the present invention.

FIG. 3 shows a second exemplary embodiment according to the present invention, and the elements shown in FIG. 3 that differ from the elements in FIG. 2 only by the first digit of the reference numeral represent component parts that are the same or functionally the same and are not described again below. This similarly applies to the further figures that follow.

With reference to FIG. 3, the device for equalizing has in addition to a first means 316 for equalizing the received signal and for supplying a first equalized received signal an adaptive equalizer or second means 328 for equalizing the received signal and for supplying a second equalized received signal, the second means 328 for equalizing the received signal having a second settable equalization, which differs from the first settable equalization of the first means 316 for equalizing. The device for equalizing a received signal also has in addition to the first means 323 for taking decisions and for supplying a first estimate signal a second means 330 for taking decisions and for supplying a second estimate signal, which estimates the transmitted symbols of the transmitted signal and supplies the estimated symbols in a second estimate signal.

In comparison with the first exemplary embodiment of FIG. 2, the device for equalizing a received signal also has in addition to the first means 325 for supplying a first error signal ê a second means 332 for supplying a second error signal ê', which determines the second error signal ê' from the difference between the first estimate signal, which is supplied by the second means 330 for taking decisions, and the second equalized received signal, which is supplied by the second means 328 for equalizing the received signal.

In the case of this second exemplary embodiment, the means 318 for setting the settable equalization of the received signal determines the second settable equalization of the second means 328 for equalizing the received signal from the received signal and the second error signal ê', which is supplied by the second means 332 for supplying a second error signal ê'. The means 318 for setting or automatically updating the setting of the second means 328 for equalizing preferably derives the settable equalization from the correlation of the received signal and the second error signal ê'.

The means 320 for monitoring the received signal switches the second error signal ê' through to the means 318 for setting and activates the means 318 for setting the settable equalization when the transmitted signal assigned to the received signal has particular properties, such as for example a white frequency spectrum. As in the case of the first exemplary embodiment, the means 320 for monitoring the received signal optionally supplies by means of a switch 327 either the first equalized received signal, which is supplied by the first means 316 for equalizing the received signal, or the first estimate signal, which is supplied by the first means 323 for taking decisions.

By contrast with the first exemplary embodiment, the device for equalizing a received signal according to the second exemplary embodiment also has a means 334 for comparing, which compares a first quality level, which is derived from the first error signal ê, and a second quality level, which is derived from the second error signal ê', and, if the second quality level is greater than the first quality level, instigates that the set equalization of the second means 328 for equalizing the received signal is supplied by the means 318 to the first means 316 for equalizing the received signal by means of a switch 340. Preferably arranged upstream of the means 334 for comparing the first and second quality levels, for ascertaining the first and second quality levels, are a first means 336 for ascertaining a first quality level and a second means 338 for ascertaining a second quality level, which for example derive the first and second quality levels from the mean square errors of the first error signal ê and the second error signal ê', respectively, and supply them to the means 334 for comparing.

If the second means 328 for equalizing a received signal has a programmable coefficient filter, the error ê', which is ascertained after the second means 330 for taking decisions, which follows the second means 328 for equalizing a received signal, is to be used for the coefficient adaptation of the second means 328 for equalizing the received signal.

As already mentioned, the transmission spectrum may deviate from the ideal of a flat baseband signal with a low-pass characteristic. As already mentioned above, this deviation is to be taken into account in the means 220, 320 for monitoring in FIGS. 2 and 3 in the form of a reference spectrum.

As in the case of the exemplary embodiments described below, an improvement of the convergence behavior is generally achieved, however, by using a shaping filter, which compensates as far as possible for the difference from the ideal spectrum. In this way, a spectrum that is as flat as possible can be achieved for example in the transmission band. A new reference spectrum is obtained for the signal processing downstream of a shaping filter. There are various different ways of extending the structures according to the present invention by adding a shaping filter. However, it must always be ensured that only signals which relate to the same reference spectrum are combined, such as for example the correlation of a signal before a means for equalizing the error signal after a means for taking decisions. Therefore, it will generally be required to insert a number of shaping filters at different points of the signal processing.

The introduction of a shaping filter is expedient in particular in the case of signal processing parallel to the direct reception path, such as for example of the second means for equalizing a received signal or the adaptive equalizer shown in FIG. 3, since the received spectrum must not be "shaped" in comparison with the transmission spectrum. However, insertion of a shaping filter and a downstream shaping filter which has a filter function that is inverse to the filter function of the first shaping filter into the direct reception path is not advisable in practice.

Figure 4:
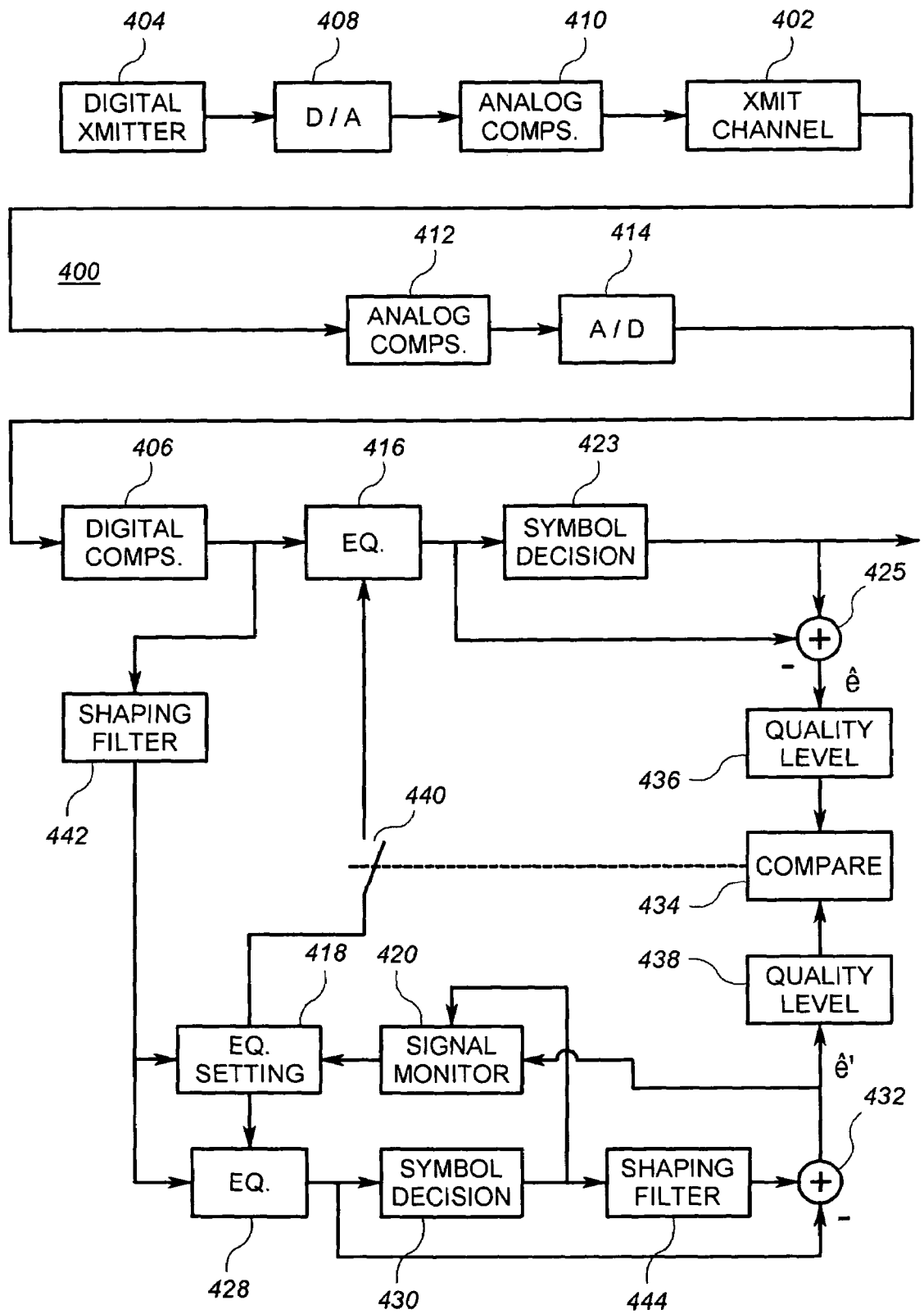
FIG. 4 shows a third exemplary embodiment according to the present invention.

FIG. 4 shows a third exemplary embodiment of a device according to the present invention. By contrast with the second exemplary embodiment, the means 420 for monitoring the received signal monitors optionally either the second equalized received signal, which is supplied by the second means 428 for equalizing the received signal, or the second estimate signal, which is supplied by the second means 430 for taking decisions, that is signals after the adaptive equalizer.

By contrast with the second exemplary embodiment of FIG. 3, the device for equalizing a received signal also comprises a first shaping filter 442, which supplies a shaped received signal to the second means 428 for equalizing the received signal and to the means 418 for setting or automatically updating the equalizer setting, and a second shaping filter 444, which has a filter function corresponding to the first shaping filter 442 and supplies a shaped second estimate signal to the means 432 for supplying a second error signal ê". The second shaping filter 444, which is arranged downstream of the second means 430 for taking decisions, ensures that the calculation of the second error ê" takes place after the second means 430 for taking decisions with respect to the same reference to which the shaped received signal for the means 414 for setting the settable equalization also relates. The error ê" ascertained in this way, or the second error signal ê" ascertained in this way, is not identical to the ascertained error ê' or the second error signal ê' of FIG. 3. The error signal ê' is obtained from ê" by means of a shaping filter with a filter function which is inverse to the filter function of the second shaping filter 444. The error ê" can be used, however, in first approximation for the MMSE calculation.

Figure 5:
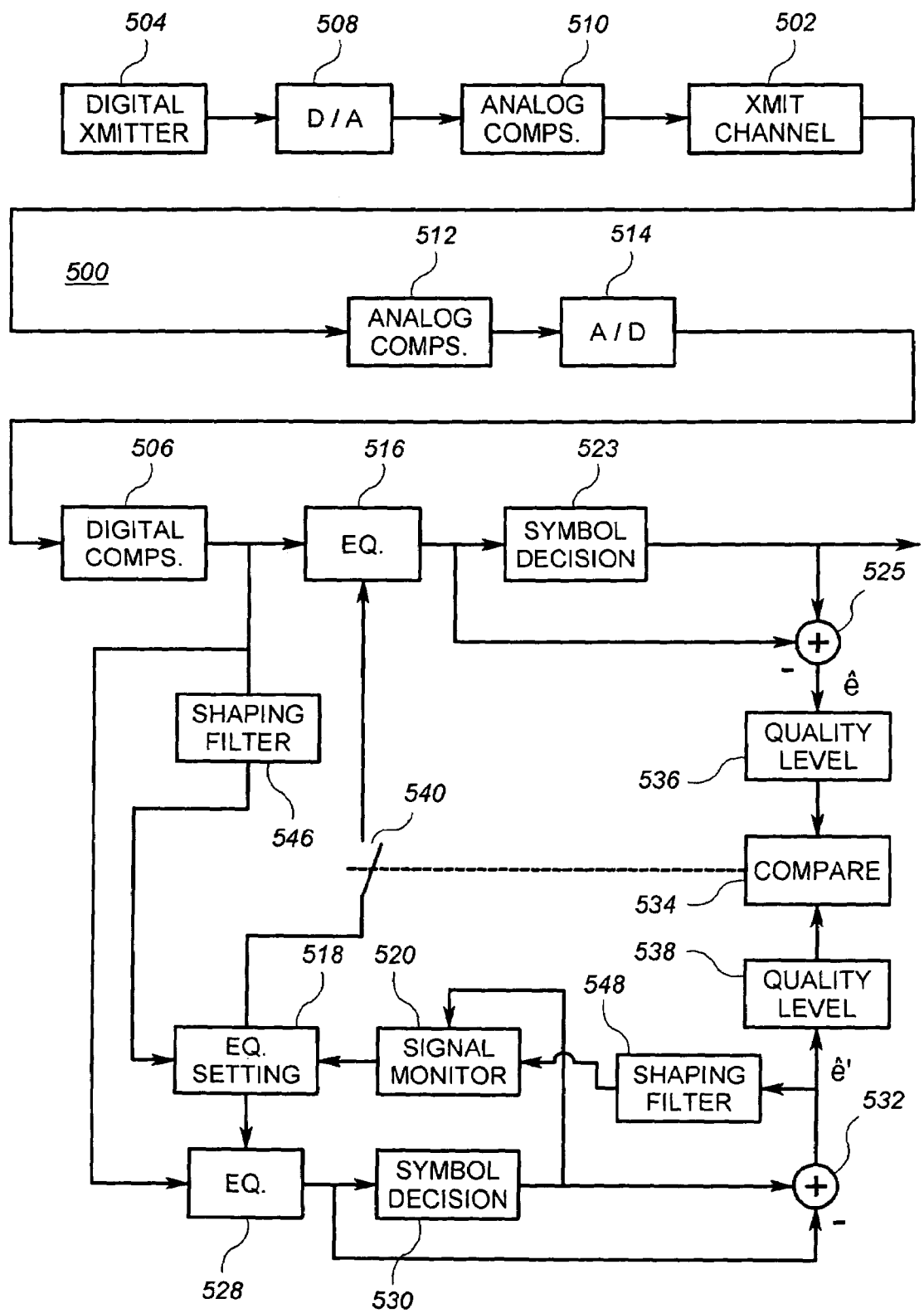
FIG. 5 shows a fourth exemplary embodiment according to the present invention.

FIG. 5 shows a fourth exemplary embodiment according to the present invention. By contrast with the third exemplary embodiment of FIG. 4, provided in the case of this exemplary embodiment are a first shaping filter 546, which supplies a shaped received signal to the means 518 for setting the settable equalization, and a second shaping filter 548, which has a filter function identical to the first shaping filter 546 and supplies a shaped second error signal ê' to the means 520 for monitoring the received signal.

While this invention has been described in terms of several preferred embodiments, there are alterations, permutations, and equivalents which fall within the scope of this invention. It should also be noted that there are many alternative ways of implementing the methods and systems of the present invention. It is therefore intended that the following appended claims be interpreted as including all such alterations, permutations, and equivalents as fall within the true spirit and scope of the present invention.

The invention claimed is:

1. A device for equalizing a received signal comprising:
a first signal equalizer having a first received signal input, a first settable coefficient used to equalize the signal, a first coefficient input configured to allow the first coefficient to be set, and a first equalized signal output;
a coefficient setting component having a first control input, and having a first coefficient output operably connected to the first coefficient input of the first signal equalizer, the coefficient setting component controllably operable to set the first signal equalizer coefficient; and
a received signal monitor configured to monitor the signal received by the first signal equalizer and capable of detecting a first and a second signal property, the monitor operably connected to the first control input of the coefficient setting component, such that when the first signal property is detected the received signal monitor does not enable the coefficient setting component to set the first coefficient and when the second signal property is detected the received signal monitor enables the coefficient setting component to set the first coefficient, the received signal monitor including a filter bank configured to detect energy distribution in the received signal.

2. The device of claim 1, further comprising,
a first signal estimator having an input operably connected to the first equalized signal output, and having a first estimated signal output.

3. The device of claim 2, further comprising,
a first error detector having a first input operably connected to the first estimated signal output, having a second input operably connected to the first equalized signal output, and having a first detected error output.

4. The device of claim 3, wherein the coefficient setting component is controlled by selective operable connection of the first control input to the first detected error output, the coefficient setting component further comprising:
a received signal input configured to receive the signal.

5. The device of claim 4, wherein the coefficient setting component correlates the first detected error output and the received signal to derive the first coefficient to be set in the first signal equalizer.

6. The device of claim 4, wherein the received signal monitor is operable to selectively connect the first detected error output to the first control input of the coefficient setting component in response to detection of the second signal property.

7. The device of claim 3, further comprising,
a second signal equalizer having a second received signal input, a second settable coefficient used to equalize the signal, a second coefficient input configured to allow the second coefficient to be set, and a second equalized signal output, and wherein the coefficient setting component further comprises:
a second coefficient output operably connected to the second coefficient input of the second signal equalizer, the coefficient setting component controllably operable to set the second signal equalizer coefficient.

8. The device of claim 7, further comprising,
a second signal estimator having an input operably connected to the second equalized signal output, and having a second estimated signal output.

9. The device of claim 8, further comprising,
a second error detector having a first input operably connected to the second estimated signal output, having a second input operably connected to the second equalized signal output, and having a second detected error output.

10. The device of claim 9, the coefficient setting component further comprising:
a second control input, the second control input capable of selective connectivity to the output of the second error detector.

11. The device of claim 10, wherein the coefficient setting component correlates the received signal and the output of the second error detector to derive the second coefficient.

12. The device of claim 11, wherein the received signal monitor is operable to selectively connect the second detected error output to the second control input of the coefficient setting component in response to detection of the second signal property.

13. The device of claim 12, further comprising:
a switch operably connected to the first coefficient input of the first signal equalizer and having a first switch position operably connected to the first coefficient output of the coefficient setting component and a second switch position operably connected to the second coefficient output of the coefficient setting component; and
a comparator having a first input operably connected to the first detected error output, having a second input operably connected to the second detected error output, and having a comparison condition output controllably connected to the switch, the comparator operable to generate a first and a second comparison condition based upon the first and the second detected error output, such that when the first comparison condition is generated the switch is placed in the first switch position and when the second comparison condition is generated the switch is placed in the second switch position.

14. The device of claim 13, further comprising:
a first means for ascertaining a quality level having an input operably connected to the first detected error output, and having a quality level output operably connected to the first input of the comparator; and
a second means for ascertaining a quality level having an input operably connected to the second detected error output, and having a quality level output operably connected to the second input of the comparator.

15. The device of claim 14, wherein the quality level of the first means for ascertaining a quality level comprises a mean square error of the first detected error output and the quality level of the second means for ascertaining a quality level comprises a mean square error of the second detected error output.

16. The device of claim 9, further comprising:
a first shaping filter having an input operably connected to receive the signal and an output operably connected to the second equalizer and the coefficient setting component, such that the signal received by the second equalizer and the coefficient setting component is a filtered received signal; and
a second shaping filter having an input operably connected to the output of the second signal estimator, and an output operably connected to the input of the second error detector, and having a filter function corresponding to the filter function of the first shaping filter.

17. The device of claim 9, further comprising:
a first shaping filter having an input operably connected to receive the signal and a filtered output operably connected to the received signal input of the coefficient setting component, such that the signal received by the coefficient setting component is a filtered received signal; and
a second shaping filter having an input operably connected to the second detected error output, and a filtered output selectively connectable to the second control input of the coefficient setting component, and having a filter function corresponding to the filter function of the first shaping filter.

18. The device of claim 8, further comprising;
a switch operably connected to the received signal monitor and having a first position operably connected to the second equalized signal output, and having a second position operably connected to the second estimated signal output, such that when the switch is in the first position, the received signal monitor monitors the second equalized received signal and when the switch is in the second position the received signal monitor monitors the second estimated signal output.

19. The device of claim 7, the first signal equalizer further comprising,
a filter, and wherein the first settable coefficient comprises a programmable input of the filter.

20. The device of claim 19, further comprising:
a first memory area for storing a first at least one filter coefficient.

21. The device of claim 20, wherein the first at least one filter coefficient comprises a filter coefficient selected for use in the initialization of the transmission of a signal.

22. The device of claim 21, further comprising;
a second memory area for storing a second at least one filter coefficient.

23. The device of claim 22, wherein the second at least one filter coefficient is passed to the second memory area from the coefficient setting component.

24. The device of claim 2, further comprising;
a switch operably connected to the received signal monitor and having a first position operably connected to the first equalized signal output, and having a second position operably connected to the first estimated signal output, such that when the switch is in the first position, the received signal monitor monitors the first equalized signal output and when the switch is in the second position the received signal monitor monitors the first estimated signal output.

25. The device of claim 1, wherein the filter bank comprises bandpass filters.

26. A device for equalizing a received signal comprising:
a first signal equalizer having a first received signal input, a first settable coefficient used to equalize the signal, a first coefficient input configured to allow the first coefficient to be set, and a first equalized signal output:
a coefficient setting component having a first control input, and having a first coefficient output operably connected to the first coefficient input of the first signal equalizer, the coefficient setting component controllably operable to set the first signal equalizer coefficient; and
a received signal monitor configured to monitor the signal received by the first signal equalizer and capable of detecting a first and a second signal property, the monitor operably connected to the first control input of the coefficient setting component, such that when the first signal property is detected the received signal monitor does not enable the coefficient setting component to set the first coefficient and when the second signal property is detected the received signal monitor enables the coefficient setting component to set the first coefficient, wherein the received signal monitor performs a Fourier transformation to detect energy distribution in the received signal.

27. The device of claim 1, the received signal monitor further comprising:
a reference spectrum, the reference spectrum having the form of a flat baseband signal with a low-pass characteristic, and wherein monitoring the signal received by the device comprises a comparison of the received energy to the reference spectrum.

28. The device of claim 1, wherein the input signal monitor performs a statistical analysis of at least one detected signal property.

* * * * *